Feb. 17, 1953  A. L. WILLIAMS  2,628,523
WRENCH PROVIDED WITH A COTTER PIN HOLE LOCATOR

Filed Dec. 27, 1950

INVENTOR.
Allen L. Williams
BY Victor J. Evans & Co.
ATTORNEYS

UNITED STATES PATENT OFFICE 2,628,523

WRENCH PROVIDED WITH A COTTER PIN HOLE LOCATOR

Allen L. Williams, Park Ridge, Ill.

Application December 27, 1950, Serial No. 202,920

1 Claim. (Cl. 81—180)

This invention relates to nut wrenches used primarily for nuts where cotter pins are used for retaining nuts in position upon bolts, and in particular a spring arm having a pin extending from an end thereof for locating the cotter pin hole through a bolt upon which a nut is threaded with means for attaching the spring arm to the handle of a wrench and with the attaching means positioning the cotter pin hole locating pin in a cotter pin receiving slot in the end of the nut, upon which the wrench is used.

The purpose of this invention is to facilitate lining up cotter pin receiving slots in the ends of nuts with holes for cotter pins through bolts upon which the nuts are used and whereby the trial and error method of locating holes for cotter pins, particularly in out of the way places is eliminated.

In the usual method of applying cotter pins to lock nuts and the like, particularly where it is impossible to look through the hole, it is necessary to turn the nut until a nail, pin, or the like may be inserted in the hole through the end of the bolt. This method consumes considerable time and in some cases it is very difficult to locate the hole. With this thought in mind this invention contemplates an attachment positioned on the side of a wrench with a pin suspended by a spring arm whereby with the pin positioned in a slot in the end of a nut the inner end rides over the threads of a bolt upon which the nut is positioned until the slot in which the pin is positioned is in registering relation with a cotter pin hole through the bolt. At this time the pin drops into the opening through the bolt and upon removal of the pin and wrench the cotter pin may readily be inserted through the slot of the nut and opening through the bolt.

The object of this invention is, therefore, to provide means for mounting a locating pin on a wrench whereby with the pin extended through a slot in a nut threaded on a bolt the pin drops into a cotter pin opening through the bolt upon registry of the slot of the nut with the hole, or opening.

Another object of the invention is to provide a cotter pin hole locating attachment for nut wrenches that may be applied to wrenches now in use without changing the design or construction thereof.

A further object of the invention is to provide a cotter pin hole locating attachment for nut wrenches which is of a simple and economical construction.

With these and other objects and advantages in view the invention embodies a bar having spring clips on the ends for attaching the bar to the handle of a wrench with a spring arm having a pin extending from the end thereof carried by the bar and positioned with the pin extended radially from the center of the nut receiving socket of the wrench.

Other features and advantages of the invention will appear from the following description taken in connection with the drawings wherein.

Figure 1:
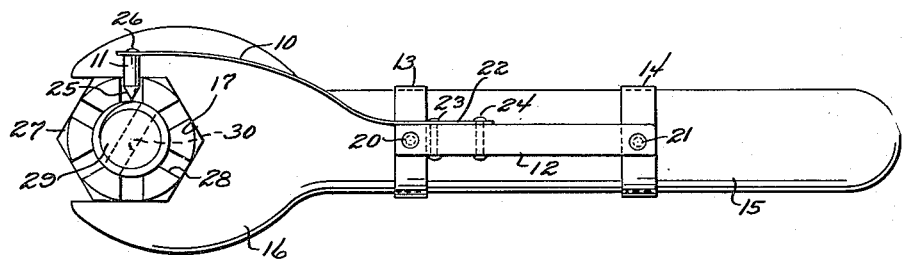
Figure 1 is a side elevational view of a nut wrench having a cotter pin hole locating pin mounted thereon, showing the pin in a slot of a nut positioned in the wrench and with the point thereof riding upon the threads of a bolt upon which the nut is threaded.

Referring now to the drawings wherein like reference characters denote corresponding parts the cotter pin hole locating attachment of this invention includes a spring arm 10, a pin 11 carried by the outer end of the arm, a bar 12 upon which the opposite end of the arm is mounted and spring clips 13 and 14 for removably attaching the device to a handle 15 of a wrench having a head 16 with a nut receiving socket 17 therein.

With the parts formed in this manner the spring clips 13 and 14 are formed with arcuate upper and lower ends 18 and 19, respectively and one end of the bar 12 is secured to the clip 13 by a rivet 20 with the opposite end secured to the clip 14 by a rivet 21.

The spring arm 10 is provided with a flat end 22 that is secured to the bar 12 by rivets 23 and 24. The arm 10 extends outwardly and upwardly and the pin 11, which is provided with a point 25 is secured in the outer end of the arm 10 by a rivet 26, or the like.

Figure 2:
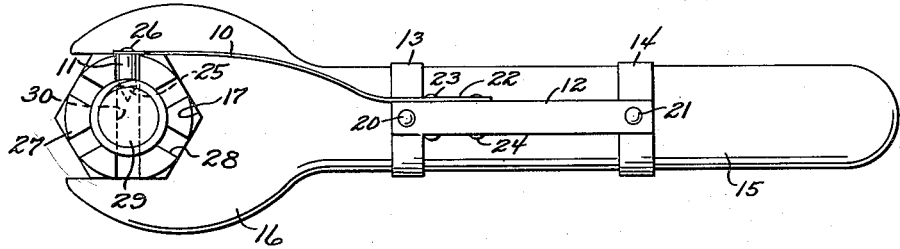
Figure 2 is a similar view showing the pin with the point thereof dropped inwardly into the cotter pin opening of the bolt.
Figure 3:
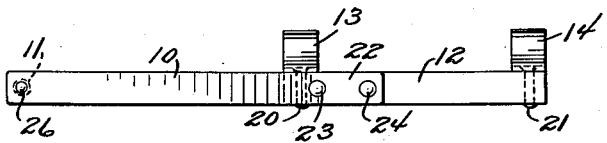
Figure 3 is a plan view showing the attachment removed from the wrench.
Figure 4:
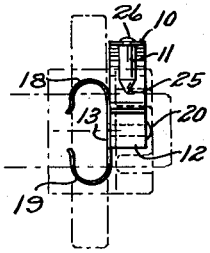
Figure 4 is an end view looking toward the end of the attachment in which the pin is positioned and showing a wrench, nut and bolt in dotted lines.

With the parts formed in this manner a nut 27 having cotter pin receiving slots 28 in the outer end, is threaded upon a bolt 29 and when the nut is substantially tight the attachment is placed upon the handle of the wrench and the pin 11 inserted in one of the slots 28. The tightening of the nut is then continued until the end 25 of the pin 11 registers with a cotter pin hole 30 extended through the bolt and with the parts in this position the pin 11 drops into the hole 30, as illustrated in Fig. 2.

With the position of the cotter pin hole located in this manner the pin and wrench are removed and a cotter pin inserted through the slot of the nut and hole through the bolt.

It will be understood that although the parts, such as the spring arm 10, the bar 12, and the clips 13 and 14, are secured by rivets, these parts may be secured by welding or other suitable means.

It will be understood that modifications may be made in the design and arrangement of the parts without departing from the spirit of the invention.

What is claimed is:

In a cotter pin hole locating attachment for a wrench, the combination which comprises a wrench having a handle with a head having a nut receiving socket therein positioned at one end of the handle, a longitudinally disposed bar positioned on one side of and parallel to the handle of the wrench, spring clips on the ends of the bar extended around the handle in planes at right angles to the longitudinal axis of the bar for retaining the bar in position upon the handle, a spring arm having an arcuate outer end carried by the side of the bar and extended on one side of the head of the wrench in a plane extending at right angles to the plane of the handle, and a pin carried by the arcuate outer end of the spring arm perpendicular thereto and parallel to the side of the head of the wrench and positioned to extend through slots in a nut positioned in the socket of the head of the wrench, said pin carried by the arcuate outer end of the spring arm also positioned to extend into a cotter pin hole extended through a bolt upon which a nut positioned in the socket in the head of the wrench is threaded.

ALLEN L. WILLIAMS.

REFERENCES CITED

The following references are of record in the file of this patent:

UNITED STATES PATENTS

| Number | Name | Date |
|---|---|---|
| 448,124 | Conroy | Mar. 10, 1891 |
| 580,685 | Hall | Apr. 13, 1897 |
| 1,558,267 | McGuckin | Oct. 20, 1925 |

FOREIGN PATENTS

| Number | Country | Date |
|---|---|---|
| 199,585 | Canada | Apr. 27, 1920 |